(12) United States Patent
Lameer

(10) Patent No.: US 6,202,035 B1
(45) Date of Patent: Mar. 13, 2001

(54) SYSTEM FOR DETERMINING TIME OR DIRECTION FOR PRAYER

(75) Inventor: Joep Lameer, Paris (FR)

(73) Assignee: Ballad Investment N.V. (NL)

( * ) Notice: Subject to any disclaimer, the term of this patent is extended or adjusted under 35 U.S.C. 154(b) by 0 days.

(21) Appl. No.: 09/077,058

(22) PCT Filed: Nov. 15, 1996

(86) PCT No.: PCT/EP96/05054

§ 371 Date: Feb. 22, 1999

§ 102(e) Date: Feb. 22, 1999

(87) PCT Pub. No.: WO97/19321

PCT Pub. Date: May 29, 1997

(30) Foreign Application Priority Data

Nov. 17, 1995 (NL) .................................................. 1001683

(51) Int. Cl.$^7$ ...................................................... H04Q 7/20
(52) U.S. Cl. ................. 702/178; 368/21; 368/10; 368/15; 368/69; 342/443
(58) Field of Search .................................. 342/443, 417, 342/419; 368/10, 21, 69, 15, 223, 229; 455/422; 701/201, 206, 213; 702/178

(56) References Cited

U.S. PATENT DOCUMENTS

| 4,659,231 | * | 4/1987 | Barkouki | 368/15 |
| 5,173,709 | | 12/1992 | George et al. | 368/15 |
| 5,208,790 | * | 5/1993 | Sato | 368/15 |
| 6,097,945 | * | 8/2000 | Geir | 455/422 |

FOREIGN PATENT DOCUMENTS

| 0660205 | 6/1995 | (EP) . |
| 2681159 | 3/1993 | (FR) . |
| 2683056 | 4/1993 | (FR) . |
| 2136609 | 9/1984 | (GB) . |

* cited by examiner

Primary Examiner—Kamini Shah
(74) Attorney, Agent, or Firm—Ostrolenk, Faber, Gerb & Soffen, LLP

(57) ABSTRACT

The present invention relates to a device for determining a time and/or direction for prayer, comprising: receiving means for receiving signals indicative of a position on or above the earth; computing means for computing a time for prayer on the basis of the received signals; and display means for displaying a computed time for prayer, characterized in that the receiving means are adapted to receive GPS signals coming from satellites, that the computing means are adapted and connected to the receiving means such that the desired prayer direction on the basis of the position as well as the desired time for prayer are computed directly from the GPS signals, and both are displayed on a screen of the display means.

4 Claims, 1 Drawing Sheet

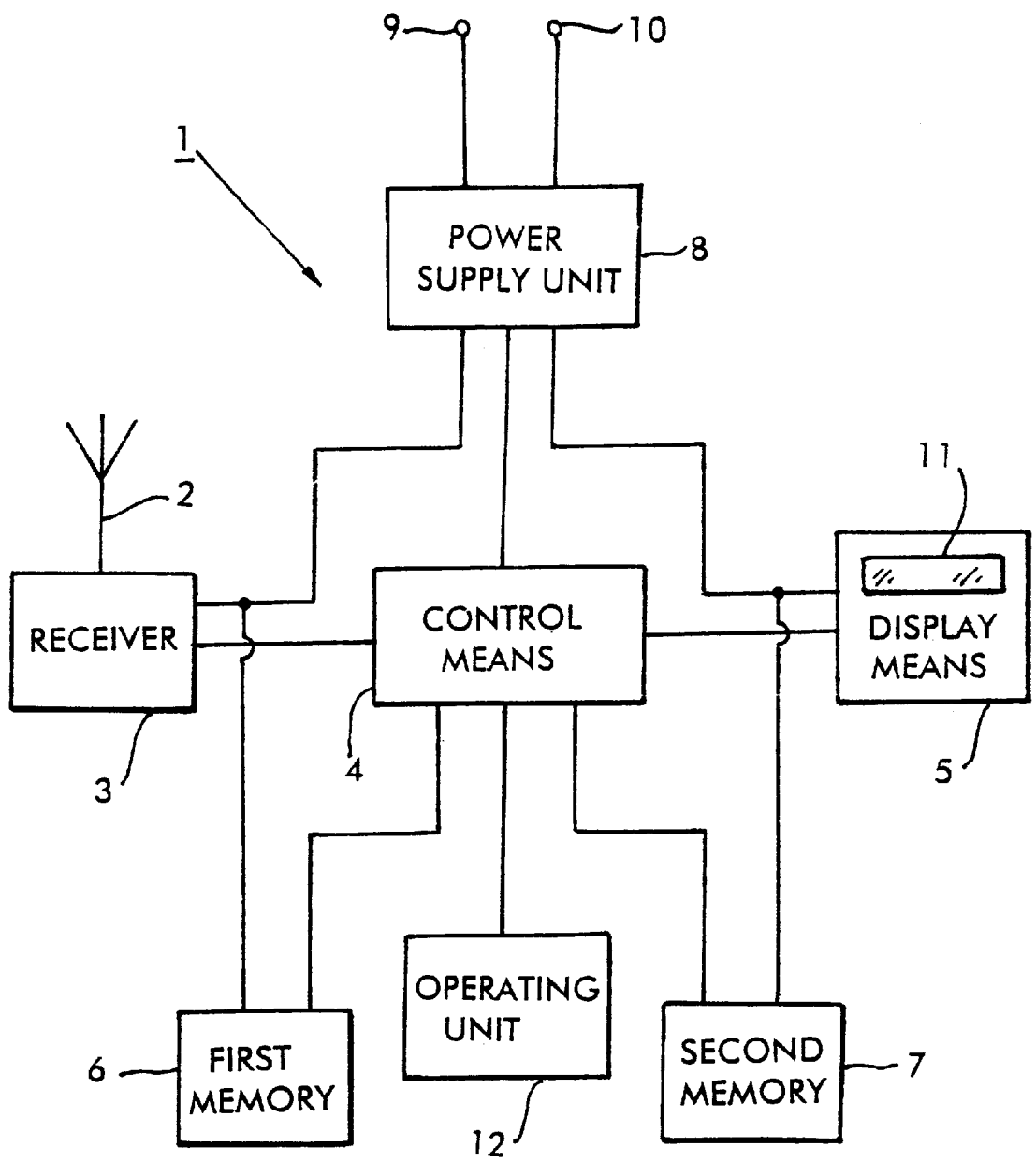

SYSTEM FOR DETERMINING TIME OR DIRECTION FOR PRAYER

BACKGROUND OF THE INVENTION

1. Field of the Invention

The invention relates to communications, and more particularly to directive radio wave systems and devices.

2. Description of the Related Art

From the early beginnings of Islam determining of the correct time and location (and astronomy) have been of great importance, mostly on account of the central idea of Islam that correct times for prayer and the correct direction of prayer (toward the Kaaba, the shrine situated on the courtyard of the Great Mosque in Mecca) must be adhered to as meticulously as possible. The calculation of the correct times (the starting times or temporal margins, i.e. the period of time between the earliest and latest permitted time of the different prayers to be performed daily) is related to the position of the sun and therefore requires tables and/or calculations which relate to the location at which a believer finds himself on earth (or above the earth, for instance in an aircraft) at any given moment.

In the Islamic countries the channels set aside for this purpose (e.g. daily newspapers) give the correct times for prayer for number of important cities in a country, taking into account the rules relating to a denomination (Sunnite, Shiite) and school of law predominant in that particular country.

From a practical viewpoint it is virtually impossible for muslims on their own to determine really accurately the correct direction and/or time for prayer at a random location on earth, this with the exception of the city of Mecca and its immediate environs where the direction of prayer can actually be determined visually on the inner square of the Great Mosque and, at least in theory, outside of it.

SUMMARY OF THE INVENTION

The present invention relates to a device for determining a time and/or direction for prayer, comprising:

- receiving means for receiving signals indicative of a position on or above the earth;
- computing means for computing a time for prayer on the basis or the received signals; and
- display means for displaying a computed time for prayer.

Such a device is known from the French patent specification 2.683.056. Described herein are a device and method wherein a time for prayer is determined using the computing means on the basis of the time kept in this device. In an embodiment which is not further developed reference is made to a computer set up at a distance or calculator which computes a prayer direction based on the position of the device on the basis of signals transmitted by the device. The known device is therefore equipped with both a receiver and a transmitter. The computation of the prayer direction using a signal coming from a satellite does not take place in the device itself, whereby loss of time can occur, while for undisturbed communication the device will require quite a strong transmitter. Before such a system can be implemented in practice a large number of participants must be available in order to enable realization of the necessary infrastructure. In addition, the reading of the prayer direction is cumbersome in the known device since use must be made of a protractor.

The present invention has for its object to provide a device, method and system wherein the above stated drawbacks are obviated and/or wherein the device is less bulky and complicated, wherein the greatest possible use can be made of existing infrastructure and/or wherein the desired prayer direction is easy to read.

This object is achieved in that the receiving means are adapted to receive GPS signals coming from satellites, that the computing means are adapted and connected to the receiving means such that the desired prayer direction on the basis of position as well as the desired time for prayer are computed directly from the GPS signals, and both are displayed on a screen of the display means.

GPS (Global Positioning System) is understood to means in this respect any system with which determining of position (and direction) takes place using three or more satellites present above the earth's surface; a number of systems are currently known such as NAVSTAR and GLONASS. Inter alia the following projects will possible offer comparable services in the future: ARIES, ELLIPSO, GLOBALSTAR, IRIDIUM and ODYSSEY.

In a preferred embodiment the device according to the present invention is provided with second memory means for storing inter alia relevant table data and/or algorithms or formulae for computing the times for prayer for a particular location and/or date subject to the rules as applied at a particular location and within a particular denomination or religious school of law.

Use is preferably made herein of the following six positions of the sun;

1. the beginning of the astronomical (morning) twilight
2. the beginning of sunrise
3. the position of the sun wherein the rear part of the solar disc leaves the zenith
4. the position of the sun wherein the length of the shadow of an object is equal to its shadow at the moment when the centre of the sun is at the zenith plus once or twice the length of the object
5. the end of sunset
6. the end of the astronomical (evening) twilight.

In this preferred embodiment of the device according to the present invention the user can set the correct calculation method in effective manner so that relevant phenomena are taken into account such as light refraction and diffusion, which may possible be evaluated differently per location, denomination and/or school of law.

According to the present invention it is therefore possible to obtain the correct prayer time(s) and/or the correct prayer direction extremely quickly and precisely at any location on earth. Within the Islamic world, and also outside it, the device according to the present invention can be arranged in public places with display means of large dimension, wherein it is conceivable that receiving and/or computing means are arranged separately of the display means and even that receiving, computing and/or display means are each situated at a separate location and are mutually connected in wireless manner or with electrical connections. A device can also be envisaged which has small dimensions such that it is easily portable.

BRIEF DESCRIPTION OF THE DRAWING

The present invention will be illustrated on the basis of the following description of a preferred embodiment thereof with reference to the annexed FIGURE which shows a block diagram of a preferred embodiment of the device according to the present invention.

DETAILED DESCRIPTION OF THE PREFERRED EMBODIMENT

In Islam there are five obligatory prayers a day. The time periods within which Islamic prayers can validly be performed on a particular day and at a particular location coincide with the times at which the sun occupies or passes through specific positions in the sky on this day and at this location. Use is made in practice of the six following positions of the sun, taking into account relevant phenomena for determining the times for prayer such as light refraction and diffusion, which may possibly be evaluated differently per location and/or school of law:

1. the beginning of the astronomical (morning) twilight
2. the beginning of sunrise
3. the position of the sun wherein the rear part of the solar disc leaves the zenith
4. the position of the sun wherein the length of the shadow of an object is equal to its shadow at the moment when the centre of the sun is at the zenith plus once or twice the length of the object
5. the end of sunset
6. the end of the astronomical (evening) twilight.

Device 1 (see the FIGURE) comprises a receiver 3 provided with an antenna 2 for receiving signals coming from GPS (Global Positioning System) satellites for accurate determination of the location of the user of device 1 on earth or in the airspace above the earth, for instance in an aircraft. An output of receiver 3 is connected to a computing and/or control means 4 to which are further connected a display means 5, a first memory 6 and a second memory 7. The unit 1 is also provided with a power supply unit 8 which in the shown embodiment is connected via two terminal clips 9 and 10 to the mains supply or other power source. IT is of course equally conceivable for the portable embodiment of a device according to the present invention to be provided with batteries which may or may not be rechargeable. Also shown schematically in the FIGURE is an operating unit 12 which comprises one or more keys or a whole keyboard.

It will be apparent that the device according to the present invention is provided in usual manner with a clock means, such as a quartz crystal, to cause the diverse instructions to proceed quickly and precisely in time, such as reading/ writing of the second memory means and computing/control operations of the control unit. Due to the presence of the clock means it is also possible in the usual manner to keep the correct time and data after the correct starting time and date have been set in the device.

In the embodiment shown schematically in the FIGURE the connections between the schematically shown units and means are designated with lines, suggesting that an electrical connection with a wire or other conducting material is present therebetween. It is of course also conceivable for some connections to be effected in wireless manner.

On the basis of the signals obtained from the receiver the computing and control unit 4 can, for instance by means of instruction from the first memory which can be of the ROM type, fetch a program with which this computing and control unit can compute precisely the correct times for prayer for the relevant location and data and display them on a screen 11 of the display means 5. It is also conceivable for an announcement to be made in acoustic manner, either directly via display means 5 or indirectly in connection with sound equipment set up elsewhere, that the time for prayer has begun.

The screen 11 can for instance have the dimension of the screen on a digital wristwatch which then has, or can be placed in, remote connection to the computing means, or it can have a somewhat larger size such as that of an electronic compass or other more or less compactly embodied (e.g. hand-held) navigation equipment, or much greater dimensions if use is made of a screen at a location accessible to the public.

The screen can be suitable for any random alphabet and/or numerical script.

In a manner not shown the operating unit of the device according to the present invention can be suitable for entering for instance a position, a date and, if necessary, a local time, in addition to the calendar of which use is being made (a Gregorian or an Islamic or other calendar) and/or for entering changes in or additions to the contents of the first and/or second memory means.

By making use of the receiver it is of course likewise possible, optionally in combination with for instance an electronic compass, to display the correct prayer direction on a screen.

It will usually be necessary to move with the portable device according to the present invention to a window or similar position in or close to a building or space to allow the receiver to pick up the signals from the satellites. The device is therefore preferably provided with means for retaining or storing the correct direction and time so that the user can move away again from the window or similar position without losing the obtained information.

It will be apparent that using the present invention it is also possible for other data to be computed, relevant to the practice of the Islamic religion and relating to the position of the sun or the moon at a particular location and data and, in addition to the direction, the distance of the location to the shrine in Mecca.

The rights applied for are not limited to the above described embodiment; the rights applied for are defined in the first instance by the following claims.

What is claimed is:

1. Device for determining a time and/or direction for prayer, comprising:
    receiving means for receiving signals indicative of a position on or above the earth;
    computing means for computing a time for prayer on the basis of the received signals; and
    display means for displaying a computed time for prayer;
    wherein the receiving means is adapted to receive GPS signals coming from satellites,
        the device being provided with first memory means for storing program data for the computing means, and second memory means for storing relevant table data and/or algorithms or formulae for determining the times for prayer subject to the rules as applied at a particular location and within a particular denomination or religious school of law,
        wherein in the first or second memory means the stored data relates to the following six positions of the sun:
        the beginning of the astronomical twilight;
        the beginning of sunrise;
        the position of the sun wherein the rear part of the solar disc leaves the zenith;
        the position of the sun wherein the length of the shadow of an object is equal to its shadow at the moment when the center of the sun is at the zenith plus once or twice the length of the object;
        the end of sunset; and/or
        the end of the astronomical (evening) twilight; and
    wherein the computing means is adapted and connected to the receiving means and the first and/or second memory means such that the desired prayer direction on the basis of the position as well as the desired time for prayer subject to the rules applied at a particular location and within a particular denomination or a religious school of law are computed directly from the GPS signals and from the relevant formulae at a particular location for a particular denomination or religious school of law, and both the direction and time for prayer are displayed on a screen of the display means.

2. Device according to claim 1, provided with operating means for operating the computing means.

3. Device according to claim 1, provided with adjusting means for adjusting the computing means.

4. Method for determining a time and/or direction for prayer, comprising the steps of:

receiving GPS signals from satellites indicative of a position on or above the earth;

computing a time for prayer based on the signals; and displaying the time for prayer;

wherein said computing is based on:
the beginning of the astronomical (morning) twilight; the beginning of sunrise; the position of the sun wherein the rear part of a solar disc thereof leaves the zenith; the position of the sun wherein the length of the shadow of an object is equal to two or three times the length of the shadow when the center of the sun is at the zenith; the end of sunset; and the end of the astronomical (evening) twilight; and wherein the desired prayer direction on the basis of the position as well as the desired time for prayer subject to the rules applied at a particular location and within a particular denomination or a religious school of law are computed directly from the GPS signals and from the relevant formulae at a particular location for a particular denomination or religious school of law, and both the direction and time for prayer are displayed.

* * * * *